United States Patent [19]

Johnson

[11] Patent Number: 4,934,893
[45] Date of Patent: Jun. 19, 1990

[54] BOOK SHELF MOVING APPARATUS

[76] Inventor: Lester E. Johnson, Rte. 2, Box 40, Glyndon, Minn. 56547

[21] Appl. No.: 295,786

[22] Filed: Jan. 11, 1989

[51] Int. Cl.$^5$ ............................................. B60P 1/02
[52] U.S. Cl. .................... 414/458; 254/2 R; 414/786
[58] Field of Search ................ 414/458–461, 414/495, 498, 608, 786; 254/2 R, 134

[56] References Cited

U.S. PATENT DOCUMENTS

| | | | |
|---|---|---|---|
| 1,520,630 | 12/1924 | Bateman | 414/458 |
| 1,557,344 | 10/1925 | Schuh | 414/459 |
| 2,359,016 | 9/1944 | Wood | 414/458 X |
| 2,508,661 | 5/1950 | Campbell | 414/458 |
| 2,706,057 | 4/1955 | Belding | 414/459 |
| 2,897,989 | 8/1959 | Hounsell | 414/458 |
| 2,994,939 | 8/1961 | Matthews | 254/2 R X |
| 3,010,592 | 11/1961 | Chadwick | 414/458 |
| 3,145,863 | 8/1964 | Dunaski | 414/458 |
| 3,327,996 | 6/1967 | Morse | 414/458 X |
| 3,486,650 | 12/1969 | Boone | 414/458 |
| 3,570,694 | 3/1971 | Tantlinger | 414/458 |
| 3,672,634 | 6/1972 | Chaffin | 414/458 X |
| 3,797,460 | 3/1974 | Blankenship | 414/608 X |
| 4,050,672 | 9/1977 | Lane | 414/458 |
| 4,491,452 | 1/1985 | Matovich | 414/458 X |

FOREIGN PATENT DOCUMENTS

| | | | |
|---|---|---|---|
| 545022 | 8/1957 | Canada | 414/458 |
| 1455636 | 11/1976 | United Kingdom | 414/458 |
| 2060555 | 5/1981 | United Kingdom | 414/608 |

Primary Examiner—David A. Bucci
Attorney, Agent, or Firm—Merchant, Gould, Smith, Edell, Welter & Schmidt

[57] ABSTRACT

A method and apparatus for moving book shelf units is disclosed. The book shelf units to be moved are of the type having vertical standards generally perpendicular to the ground and having a plurality of vertically spaced slots for supporting horizontal shelves between the standards. The vertical standards of the book shelf units are retainably engaged at positions therealong spaced from the ground. Moving devices are operatively connected to the engaging devices for cooperatively moving the engaging devices in a generally vertical manner relative to the ground. Therefore, movement of the engaging devices when retainably engaged to the vertical book shelf standards lifts and lowers the book shelf. Rolling devices are connected to the moving devices which enable the apparatus to be moved across the ground thereby moving the book shelf unit.

27 Claims, 6 Drawing Sheets

BOOK SHELF MOVING APPARATUS

FIELD OF THE INVENTION

This invention relates generally to a moving apparatus, and more particularly to a fully loaded book shelf unit moving apparatus using independent parts disposed on opposite sides of the article to be lifted which allow cooperative lifting of the article from opposite sides thereof.

BACKGROUND OF THE INVENTION

Typically, large heavy objects are very difficult to lift and move. It is often necessary to disassemble the article to be moved, move its components, and then reassemble the components at the new location. Particularly, movement of book shelf units can be a very time consuming, expensive project. Remodeling or expansion require that book shelf units be moved. For example, libraries must periodically replace worn carpet. Also, asbestos removal requirements have forced many institutions to remodel their libraries to remove the asbestos. Typically, only one shelf section may be moved at a time. Further, in order to move the shelves, books must be taken off the shelves and temporarily stored. This results in undue wear and tear on the books. Most significant, however, is the fact that the books are not accessible during the moving period which may take several days or weeks. The books must also be stored in proper order during the process to aid in the reshelving process. After remodeling, the books must then be returned to the shelves at the new location. This is a very time consuming project which requires many hours of costly labor.

The present invention allows for easy movement of the book shelf units without removing the contents of the shelves. The present invention allows movement of the book shelf units with no preparation of the stacks required. It is not necessary to disassemble the stacks and therefore, no storage of the shelf contents is necessary. The present invention allows for cooperative lifting of an article such as a book shelf unit from opposed sides. The lifted article may then be easily moved to a new location. The apparatus is simple to use and is relatively compact to store.

Several prior art devices have been specifically designed for lifting different types of heavy objects, but none of such structures have enabled easy movement or handling of book shelf units. For example, U.S. Pat. No. 2,508,661 to Campbell discloses an apparatus for transporting heavy objects of a type having engageable cantilevered members able to support the weight of the structure. A unitized wheeled frame which is open at one end is utilized where the frame is moved into position from one end of the article to be lifted. Inwardly extending and oppositely disposed lifting arms are used to engage the cantilevered portions of the article which is lifted by means of an operating handle lever. The device is designed specifically to engage the over hanging portions on a table top.

U.S. Pat. No. 1,557,344 to Schuh discloses a radiator transporting truck. Lifting members carried by oppositely disposed arms are specifically designed to lift radiators from the bottom. This device would be ineffective for moving book shelf units and the like.

U.S. Pat. No. 3,327,996 to Morse discloses a lifting device for counters and the like. This device utilizes a plurality of units with independent lifting structures for engaging a large article to be lifted from opposite sides thereof.

U.S. Pat. No. 3,145,863 to Dunaski discloses a furniture moving device. This device is designed to engage the lower lifting surface of the article to be moved and could be used to carry the article by its support legs. Normally the device uses pairs of its lifting units to engage opposite sides of the furniture. The furniture is then lifted by means of screw jacks on each lifting unit and is rolled to its new position on casters.

While these known lifting and moving apparatus have been useful for moving such items as radiators or selected types of furniture such as tables, chests or counters, they have not solved the problem of moving fully loaded book shelf units that have no cantilevered support surfaces that can support the load of the shelf unit and wherein it is impossible or undesirable to lift the shelf by inserting lifting supports beneath the support standards of the shelf unit.

The present invention directly addresses and solves the shortcomings of the prior art as applied to moving book shelf units and eliminates the hours and expense of manual effort that would be required if the shelves and their contents had to be moved component by component.

SUMMARY OF THE INVENTION

The present invention includes a method and apparatus for moving book shelves. More particularly, the apparatus is able to move fully loaded book shelf units using independent parts disposed on opposite sides of the article to be lifted which allow cooperative lifting of the book shelf units. The moving apparatus of the present invention is for book shelf units of the type having longitudinally spaced vertical standards, the vertical standards being generally perpendicular to the ground and having a plurality of vertically spaced slots for supporting horizontal shelves between the standards. Broadly, the apparatus of the present invention includes engaging means for retainably engaging at least two of the spaced vertical book shelf standards at positions therealong spaced from the ground; means for moving the engaging means in a generally vertical manner relative to the ground, whereby the movement of the engaging means when engaged to said vertical book shelf standards lifts and lowers the book shelf; and rolling means for moving the apparatus across the ground.

In the preferred embodiment, the apparatus includes at least one pair of independent units disposed on opposite sides of the book shelves to be moved. Each unit includes a support member and moving means connected to the support member for effecting upward and downward movement. At least two cross bars which are sized and configured to extend between the pair of units when disposed on opposite sides of the book shelf are placed in such a manner that the cross bars extend between the shelves of the book shelf unit and are adjacent to at least two of the spaced vertical standards with their opposed end portions resting on the support member of each pair of opposed units. Further, engaging means are connected to and carried by each cross bar for retainably engaging the vertical standards, whereby when the engaging means engage the vertical standards and the moving means are effected for upward movement of the support member, the book shelf is lifted from the ground.

More particularly, the moving apparatus for the book shelf units, where at least one pair of independent lifting units are disposed on opposite sides of the book shelf units, includes first and second members each having a top and bottom and being generally perpendicular to the ground and the tops of each member define a opening. An elongated horizontal support member joins the first and second members near the bottoms. First and second casters are connected to the bottoms of each first and second member respectively, which allows movement of each unit. A cross bar support is included which is generally parallel to the elongated horizontal member. The cross bar support has first and second guides which are sized and configured to slide within the openings of the first and second members. Lifting means are mounted between the first and second members and are connected to lift and lower the cross bar support which moves within a plane defined by the first and second guides.

At least one end cross bar is placed and mounted generally perpendicular to the cross bar supports of the two opposed units such that they extend between the shelves of the book shelf unit. Also, at least one pair of intermediate cross bars are placed generally perpendicular to the cross bar support in such a manner that the intermediate cross bars extend between the shelves of the book shelf units and the ends of these intermediate cross bars rest on the cross bar support of each opposed unit. Lifting members are connected to the end and intermediate cross bars. The lifting members are sized and configured to engage opposite sides of the vertical standards of the book shelf units. The apparatus as just described allows movement of the shelves when the lifting means are effected to lift the cross bar support. The cross bar support moves in a plane of the first and second members by means of the first and second guides which engages the end and intermediate cross bars and their associated lifting members directly lifting the vertical standards of the book shelf unit. Therefore, the book shelf units are lifted for movement along the ground by the casters to a designated location where the lifting means can be effected for downward movement thereby returning the book shelf units to the ground.

A method of lifting and moving a book shelf unit is disclosed where the book shelf unit is of the type having a plurality of vertical support standards longitudinally spaced along the shelf unit, the support standards having a plurality of vertically spaced slots therealong for adjustable mounting and support of shelves between the standards. The method comprises retainably engaging at least a pair of the spaced vertical support standards at the positions therealong spaced from the ground; lifting the vertical standards and thereby the book shelf units from the ground at the positions at engagement; and moving the lifted book shelf unit along the ground by rolling means connected to the lifting and engaging means.

While the invention will be described with reference to a particular configuration, shapes, and sizes, it will be understood that such configuration, shapes, and sizes can be varied within the broad scope of this invention. In particular, while the lifting means will be described as including a hydraulic jack, it will be understood that other means of lifting could be used that would equally well perform the lifting function. Further, while the lifting members will be illustrated as two pronged members, it will be understood that other configurations could equally well be used to engage the vertical standards of the book shelf units. Further, while one embodiment illustrated depicts the book shelf moving apparatus as having intermediate and end cross bars which are supported by a cross bar support, it will be understood that this configuration is not necessary to the claimed invention. Similarly, while the particular apparatus will be described as being made of tubular steel it should be understood that any other material which has the structural rigidity maybe used. These and other variations of the invention will become apparent to those skilled in the art, in light of the following description of preferred embodiments of this invention.

BRIEF DESCRIPTION OF THE DRAWINGS

Referring to the Drawing, wherein like numerals represent like parts throughout the several views.

DETAILED DESCRIPTION OF THE PREFERRED EMBODIMENT

Figure 1:
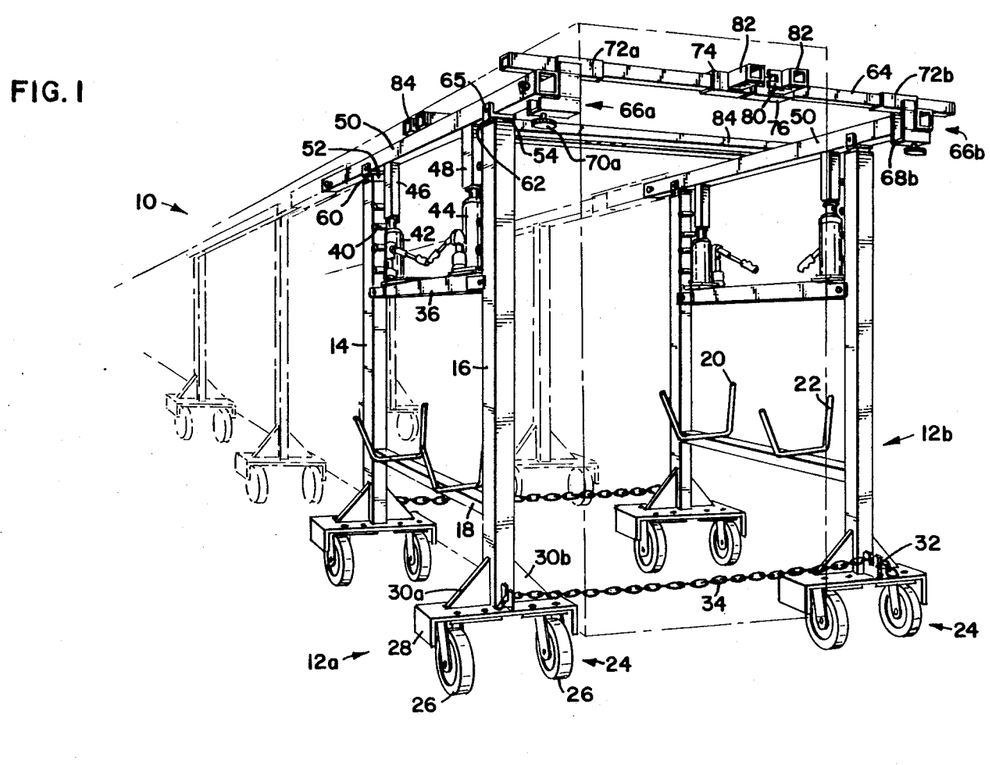
FIG. 1 is a perspective view of the apparatus; illustrating its position in relation to a book shelf unit to be moved showing independent units disposed on opposite sides of the article to be lifted.

With reference to the Drawing, wherein like reference numerals represent like parts throughout the several views, FIG. 1 generally illustrates a book shelf moving apparatus 10 which practices the principles of this invention.

The apparatus 10 includes at least one pair of units 12a and 12b. The units 12 are disposed on opposite sides of the article to be lifted (shown in phantom in FIG. 1). While the principles of this invention may be used to lift many types of articles, the preferred embodiment application for the invention is for lifting and moving book shelf units, and in particular, book shelf units whose shelves are fully or partially loaded. Each unit 12 has first and second vertically oriented standard members designated respectively at 14 and 16. First member 14 and second member 16 are, in the preferred embodiment, generally perpendicular to the ground and are joined together near their lower ends by an elongated horizontal support member 18. In the preferred embodiment, the horizontal support member 18 has a pair of U-shaped holders 20 and 22. The holders 20 and 22 provide a cradle for loose parts of the apparatus (as hereinafter described) to aid in storage and transport of the units 12.

The first and second members 14 and 16 include a caster arrangement generally shown at 24. The caster arrangement 24 includes a pair of casters 26 connected by a nut and bolt arrangement (not shown) to an inverted U-shaped plate 28. Each plate 28 is welded to the bottom of the first and second members 14 and 16 to enable the units to be moved along the ground. As shown in FIG. 1, a pair of generally triangular brace plates 30a and 30b are welded between each of the first and second members 14 and 16 and their respective U-shaped plates 28 to provide additional support for the welded connection of the plate 28 to the first and second members 14 and 16.

A slotted bracket member 32 is welded proximate the top of each plate 28 near the bottom of each vertical member 14 and 16. The slotted bracket 32 is sized to engage in locking position a link of a chain 34 or other suitable connecting means as shown in FIG. 1 to prevent the bottoms of oppositely disposed lifting units 12 from moving away from each other and out of proper lifting position, as will become more apparent upon more detailed description of operation of the lifting unit.

Figure 2:
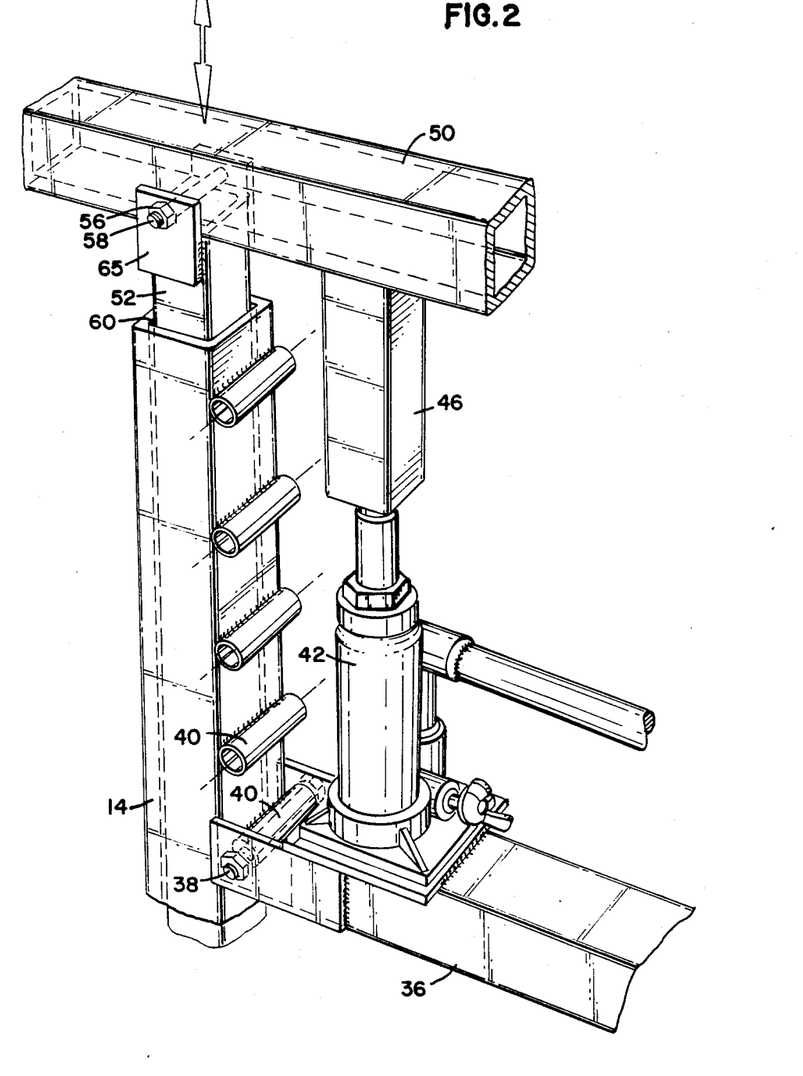
FIG. 2 is an enlarged fragmentary perspective view of one lifting means and adjustment means portion of a unit of the apparatus of FIG. 1.

The lifting unit 12 has an adjustable lifting support bar 36 that cooperatively connects the members 14 and 16 near the top portions thereof. As better illustrated in FIG. 2, a nut and bolt arrangement 38 is used in cooperation with a generally cylindrical sleeve or tube 40 to adjustably connect the end of lifting support 36 to the first member 14. As shown in FIG. 1, the same arrangement is used for connecting the opposite end of support bar 36 to the second member 16. A plurality of the tubes 40 are welded at predetermined spaced positions to each of the first and second members 14 and 16 to provide means for adjusting the height of the lifting support 36. The tubes 40 are placed in predetermined positions with the tubes 40 of the first member 14 being vertically aligned with respective ones of tubes 40 of the second member 16 such that when the opposite ends of the support bar 36 are fastened to corresponding tubes 40 of the vertical standards 14 and 16, the bar 36 will be disposed generally parallel to the ground. As will be appreciated by those skilled in the art, the lifting support bar 36 may be rapidly adjusted to the desired height for the article to be lifted by aligning the ends of the bar 36 with the desired corresponding ones of the tubes 40 and by fastening the bar ends to the tubes 40 by means of the bolt and nut combination 38.

In the preferred embodiment, first and second hydraulic jacks 42 and 44 are mounted on the lifting support 36. The jacks 42 and 44 are located proximate opposite ends of the lifting support 36. The jacks 42 and 44 are welded to the lifting support 36 in the preferred embodiment. As will be understood by those skilled in the art, while hydraulic jacks 42 and 44 are used as a lifting means in the preferred embodiment, other suitable lifting means may equally well be utilized.

The jacks 42 and 44 are able to effect downward and upward movement to a cross bar support member 50. Cross bar 50 has a pair of downwardly depending lifting contact members 46 and 48 welded to the bottom of cross bar support 50 and axially aligned for contact with the movable piston members respectively of jacks 42 and 44. The lifting contacts 46 and 48 are generally square in cross section.

The cross bar support 50 is aligned generally parallel to the lifting support 36 and is constrained for movement in the plane of the vertical support standards 14 and 16 by means of first and second guide members 52 and 54 respectively. The first and second guides 52 and 54 each has a yoke member 65 welded to their top ends. The yokes 65 are secured to the cross bar 50 by means of a nut and bolt arrangement 56 and 58 as will be apparent to those skilled in the art from the arrangement illustrated in FIG. 2. Guides 52 and 54 are generally square shaped in cross-section and sized and configured to slideably fit within the upper end openings 60 and 62 respectively of the first and second members 14 and 16. As jacks 42 and 44 provide lifting or lowering movement to lifting contacts 46 and 48, the cross bar 50 moves up or down within the plane of the support standards 14 and 16 as constrained by the guide members 52 and 54 riding within the support standards 14 and 16.

Figure 3:
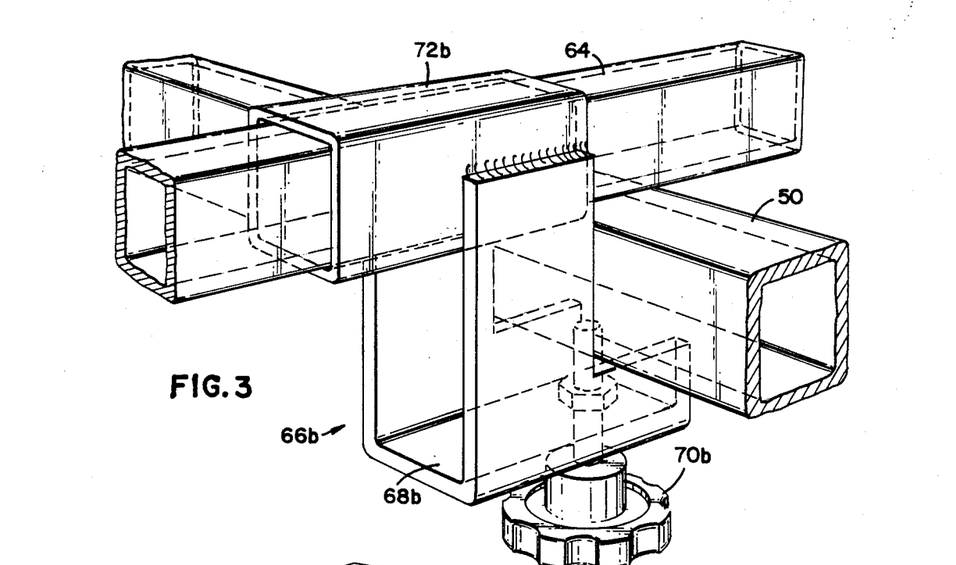
FIG. 3 is an enlarged fragmentary perspective view illustrating an end cross bar member with releasable mounting means connected to the lifting support member of a unit of the apparatus of FIG. 1.

As shown in FIG. 1, an end cross bar 64 is aligned generally perpendicular to and is supported by the cross bar support members 50 of two opposed units 12. Releasable mounting means 66a and 66b are slideably connected to the end cross bar 64 to allow clamping of the end cross bar 64 proximate the ends of the cross bar supports 50. Releasable mounting means 66b includes a bracket 68b and stop bolt 70b, shown in FIG. 3, which are used to allow placement of the end cross bar 64 through the article to be lifted. In the preferred embodiment, the bracket 68b is generally L-shaped and is welded to sleeve 72b. The sleeve 72b is sized and configured to slideably engage the end cross bar 64 allowing adjustment of the width between the pair of units 12. The opposite end of end cross bar 64 includes an opposed bracket 68a, stop bolt 70a and sleeve 72a to releasably mount the end cross bar 64 in similar manner to that described above with respect to releasable mounting means 66b. The stop bolts 70a must be securely fastened to the cross bar supports 50 to restrain against torque applied to the end cross bar 64.

Figure 4:
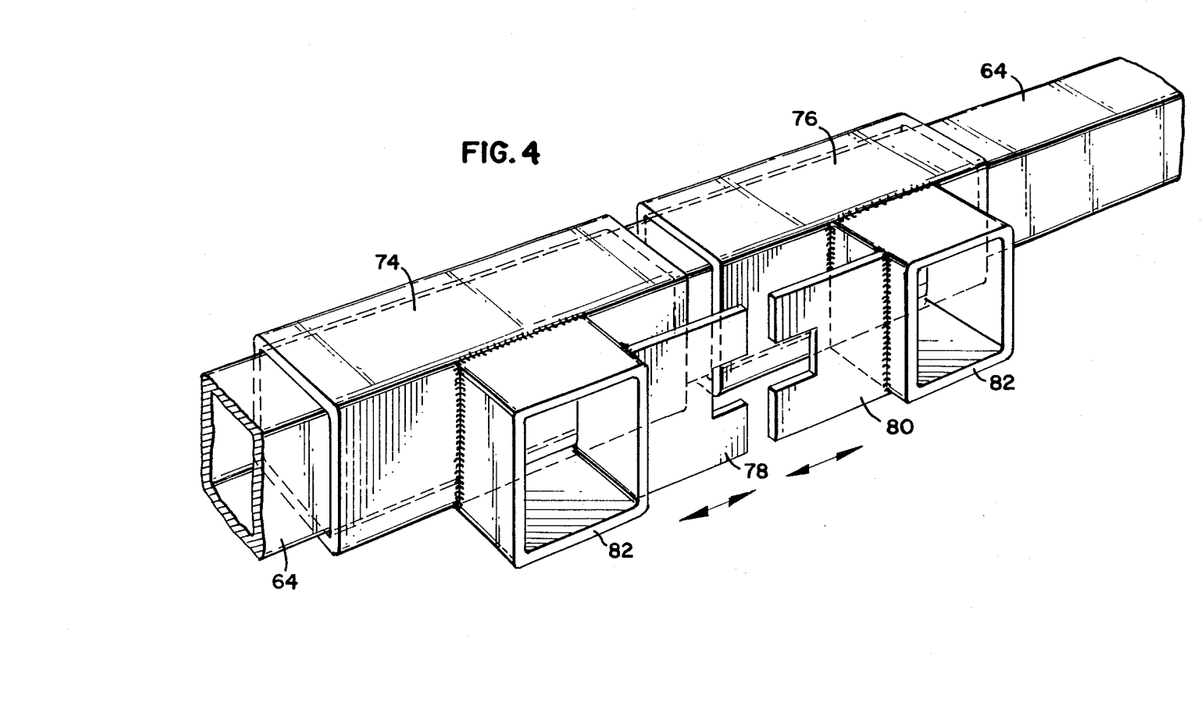
FIG. 4 is an enlarged perspective view of the central portion of the pair of end lifting members of the apparatus of FIG. 1.

As illustrated in FIGS. 1 and 4, the end cross bar 64 includes first and second sleeves 74 and 76 which are sized and configured to slideably engage and move along the end cross bar 64. In the preferred embodiment, the end cross bar 64, sleeves 72a and 72b, and sleeves 74 and 76 are formed of tubular steel and are generally square in cross-section. Sleeves 74 and 76 are positionable along cross bar 64 so as to engage the vertical support standard of a bookshelf to be moved, generally near the center of the cross bar 64. First and second sleeve members 74 and 76, respectively, have opposing lifting members 78 and 80. In the preferred embodiment, the lifting members 78 and 80 each has a pair of fork-like prongs sized and configured for slideable insertion within the shelf support slots of the vertical support standards of the book shelf units to be moved. The lifting members 78 and 80 are carried by spacer members 82 that are welded to sleeves 74 and 76 in a manner as to be opposed and operatively aligned in a place generally parallel to the cross bar 64. With the above configuration, cross bar member 64 can be positioned "inside" of the end plate of a book shelf unit and the sleeve members 74 and 76 slide along the bar 64 toward one another until their opposed lifting members 78 and 80 operatively engage the end vertical support brackets of the book shelf unit to be moved. In the preferred embodiment, an end cross bar 64 will be utilized in the above described manner at each end of the book shelf unit to be moved (not shown in FIG. 1).

Figure 5:
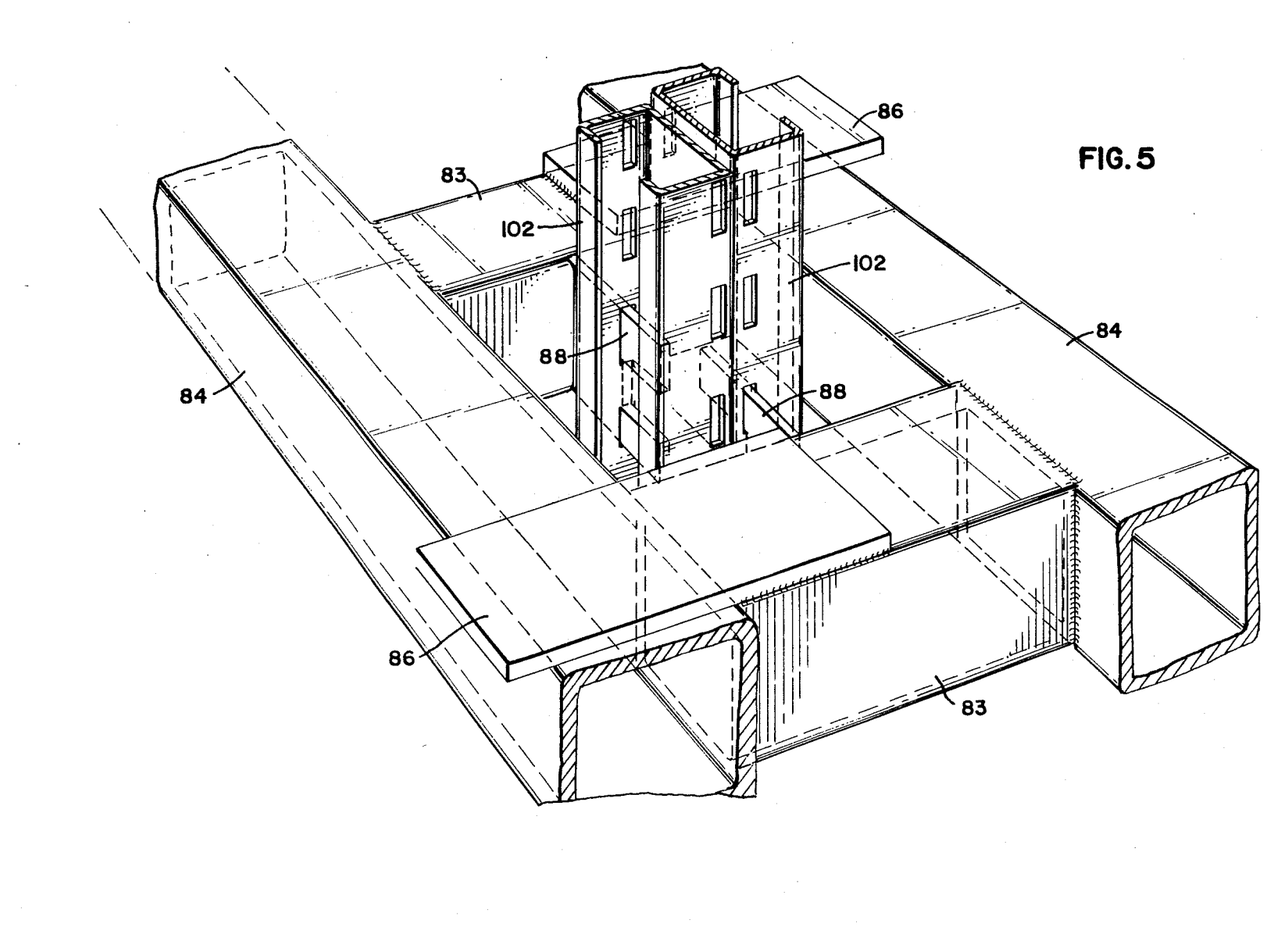
FIG. 5 is an enlarged fragmentary perspective view of a pair of intermediate cross bars of the apparatus of FIG. 1, illustrated as engaging the slots of back to back vertical frame members of a book shelf unit to be lifted.
Figure 8:
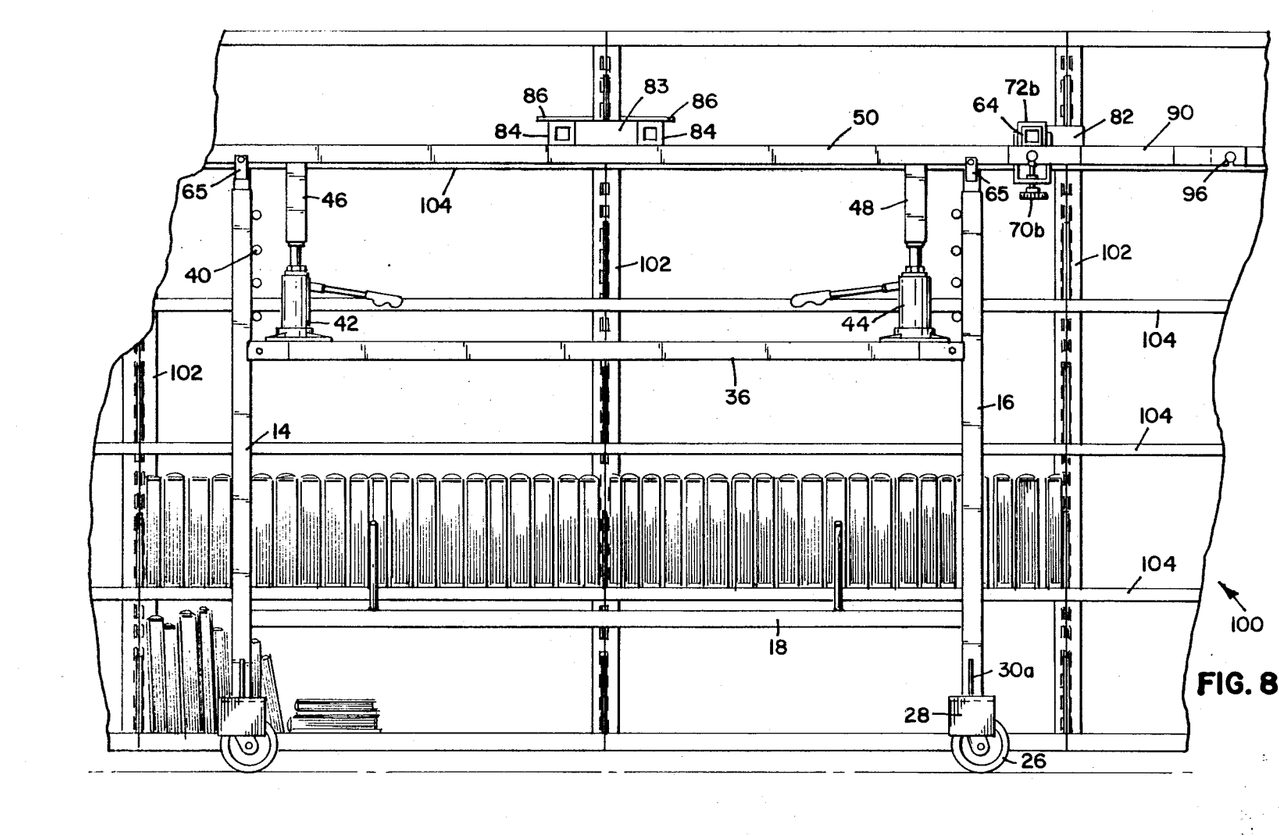
FIG. 8 is an enlarged front view illustrating the position of the apparatus in relation to a book shelf unit.

Referring now to FIGS. 1, 8 and 5, at least two intermediate cross bars 84 are utilized to support and lift the centrally positioned vertical support standards 102 of the book shelf 100 to be moved. The cross bars 84 are positioned between and supported by the cross bar supports 50 of opposed lifting units 12. Each intermediate cross bar 84 is placed generally parallel to the end cross bar 64 and perpendicular to the cross bar support 50. The intermediate cross bars 84 are utilized in pairs, as will become more apparent upon a more detailed description of the invention. Each intermediate cross bar 84 has a spacer 83 welded perpendicular to the intermediate cross bar 84. The top of the spacer 83 is generally coplanar with the top surface of the intermediate cross bar 84. A plate 86 is welded to and extends longitudinally outward from the top of the spacer 83 to slideably rest upon and be supported by the top surface of an adjacently oriented intermediate cross bar 84. Plates 86 of adjacent cross bars 84 form mirror images of each other such that when cooperatively engaged with adjacent cross bars as shown in FIG. 5, any torque forces applied to adjacent bars 84 tend to cancel one another.

Each spacer 83 has a pronged lifting member 88 similar to lifting members 78 and 80, welded to it generally perpendicular to the spacer 82 and parallel to the intermediate cross bar 84, at a distance of one inch from the intermediate cross bar 84 in the preferred embodiment. The two pronged lifting member 88 is sized and configured for slideable insertion within the slots of back to back vertical standards of double sided book shelves, as shown in FIG. 5. The intermediate cross bars 84 are positioned in an opposed manner between shelves 104 of the block shelf and are longitudinally moved in a manner such that their respective opposed lifting members 88 engage the vertical support standards from opposite sides. In the preferred embodiment, the plates 86 of the intermediate cross bars 84 are of a length which allow the opposed lifting members 88 to engage laterally spaced vertical standards while the plates 86 rest upon and are supported by the top surface of an adjacently oriented intermediate cross bar 84. The number of pairs of intermediate cross bars 84 that are used in any lifting/moving application will depend upon the number of intermediately disposed vertical shelf support standards that are to be lifted, which in turn depends in part upon the length of the book shelf unit to be moved and its load capacity and load distribution.

To lift a book shelf unit, the hydraulic jacks 42 and 44 of opposed units 12 are operated to effect upward movement, to their respective lifting contacts 46 and 48. The cross bars 50 of the units 12 are thereby raised as constrained by the guides 52 and 54 sliding upward within the first and second members 14 and 16. This raising of the cross bar support 50 simultaneously lifts the end and intermediate cross bars 64 and 84 and their associated lifting members 78, 80, and 88. Movement of the lifting members 78, 80, and 88 directly lifts those vertical support standards that they engage, thereby cooperatively lifting the entire book shelf unit from opposite sides thereof. After the book shelf unit has been lifted free of the ground, it may be easily rolled on the ground by the caster arrangement. When the shelf unit is moved to its new destination the hydraulic jacks 42 and 44 may be operated for downward movement thereby lowering the book shelf unit to the ground. The book shelf units are engaged above the center of gravity for more stabilized lifting and the units need only be lifted approximately one-half inch off the ground to be moved. Therefore, the present invention provides a stable and safe lifting device.

In the preferred embodiment, the apparatus 10 is made of steel but any other suitable material may be utilized. It will be appreciated by those skilled in the art that the design of the apparatus 10 allows for movement of book shelf units which have one end placed against a wall since the apparatus 10 does not have to surround the article to be moved. It will also be noted that the lifting operation is performed by engaging the vertical support standards well above the ground level, in a simple and efficient manner that doesn't require engagement of the shelf unit from the ground support positions.

Figure 6:
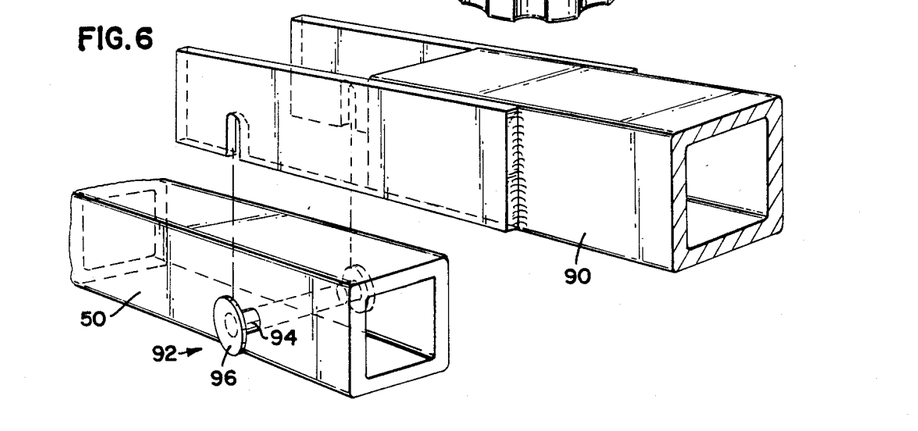
FIG. 6 is an enlarged perspective view of opposing matable end portions of extension means for the cross bar support portion of a unit of the apparatus of FIG. 1.
Figure 7:
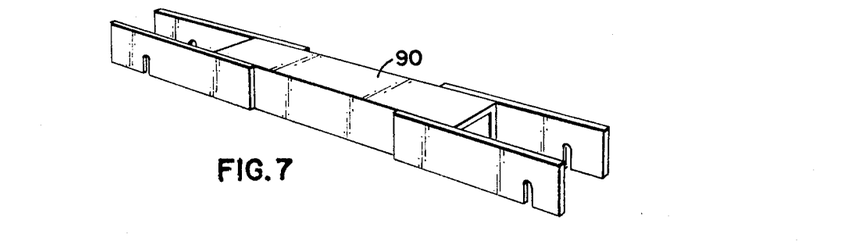
FIG. 7 is an enlarged perspective view of an extension member.

The units 12, in the preferred embodiment, are approximately six feet long and four feet high, however, it will be understood by those skilled in the art that other sizes could equally well be used. More than one unit 12 may be connected end-to-end by means of a connector member 90 (one end of which is shown in FIG. 6) to allow movement of book shelves of length greater than six feet. The connector or extension member 90 is generally longitudinally symmetrical and in the preferred embodiment has an H-shaped configuration as illustrated in FIG. 7. The end of the connector member has a pair of prongs spaced so as to cooperatively engage the side walls of the cross bar support 50. The prongs of H-shaped member 90 include notches proximate the bottom and end, as shown in FIG. 6.

The cross bar support 50 includes a pair of extension pins 92 proximate opposite ends thereof. The extension pin 92 includes a shaft 94 which is cooperatively connected to a pair of shoulders 96 proximate each end of shaft 94. The notches of the connector/extension members 90 fit around the shaft 94 thereby connecting the units 12.

The extension members 90 can be of any desired length but are, in the preferred embodiment, predetermined lengths, a short connector length and a three foot extension length. Use of the extension member 90 allows connection of the lifting units 12 for different shelf lengths. For example, a twelve foot long shelf unit can be moved by using two of the six foot lifting units 12 on each side of the shelves, connected by the short connector member 90. A fifteen foot shelf unit may be moved by using two six foot units 12 on each side of the shelves connected by the three foot long connector. These are just two of the many combinations possible to move shelf units of varying length.

While a particular embodiment of the invention has been described, other modifications of the invention will be apparent to those skilled in the art in light of the foregoing description. This description is intended to provide a specific example of an embodiment which clearly discloses the present invention. Accordingly, the invention is not limited to the described embodiment or to the use of specific elements therein. All alternative modifications and variations of the present invention which fall within the spirit and broad scope of the appended claims are covered.

What is claimed is:

1. A moving apparatus for book shelf units of the type having longitudinally spaced vertical standards, the vertical standards being generally perpendicular to the ground and having a plurality of vertically spaced slots for supporting horizontal shelves between the standards, comprising:

(a) engaging means for retainably engaging at least two of the spaced vertical bookshelf standards at positions therealong spaced from the ground;

(b) moving means operatively connected to said engaging means for cooperatively moving said engaging means in a generally vertical manner relative to the ground; whereby movement of said engaging means when engaged to said vertical bookshelf standards lifts and lowers the bookshelf; and (c) rolling means operatively connected to the moving means for moving the apparatus across the ground.

2. A moving apparatus according to claim 1, wherein said engaging means includes means for retainably engaging the vertical bookshelf standards at positions therealong located above the center of gravity of the bookshelf and any contents carried thereby.

3. A moving apparatus according to claim 2, wherein said moving means includes adjustment means for adjusting the vertical height at which said engaging means engages the vertical standards.

4. A moving apparatus according to claim 1, wherein said engaging means is arranged and configured to operatively engage the vertical bookshelf standards between shelves of the bookshelf in a manner so as not to require movement of the shelves or contents of the shelves; whereby a loaded bookshelf can be lifted and moved by the moving apparatus without disturbing the contents of the bookshelf.

5. A moving apparatus according to claim 1, wherein said engaging means includes pronged lifting members arranged and configured for slideable insertion within the slots of the engaged vertical standards.

6. The moving apparatus according to claim 5, wherein each pronged lifting member includes at least two prongs for each vertical standard engaged by said engaging means.

7. The moving apparatus according to claim 1, wherein said moving means includes a hydraulic jack.

8. The moving apparatus according to claim 1, wherein the rolling means includes casters.

9. The moving apparatus according to claim 1, wherein the bookshelf to be moved is of a double-sided type having a plurality of back-to-back longitudinally spaced vertical standards and wherein said engaging means includes means for retainably engaging both of said back-to-back vertical standards at each of the spaced locations at which said engaging means engages said standards.

10. The moving apparatus according to claim 9, wherein said engaging means includes pronged lifting members arranged and configured for slideable insertion within at least two slots of each of said engaged back to back vertical standards.

11. A moving apparatus for book shelf units of the type having longitudinally spaced vertical standards, the vertical standards being perpendicular to the ground and having a plurality of spaced slots for supporting horizontal shelves between the standards, comprising:

(a) at least one pair of independent units disposed on opposite sides of the book shelfs to be moved, each said unit having a support member and moving means operatively connected to said support member for effecting upward and downward movement of said support member;

(b) at least two cross bars sized and configured to extend between said pair of units when disposed on opposite sides of the book shelf, in a manner such that said cross bars extend between shelves of the book shelf unit and adjacent at least two of said spaced vertical standards with their opposed end portions supportingly resting upon said support members respectively of said pair of opposed units;

(c) engaging means operatively connected to and carried by each cross bar for retainably engaging said two vertical standards; and (d) whereby when said engaging means retainably engage said vertical standards and when said moving means are operable to effect upward movement of said support member, the book shelf is lifted from the ground.

12. A moving apparatus according to claim 11, wherein said engaging means includes pronged lifting members arranged and configured for longitudinal movement along said cross bars and for slideable insertion within the slots of said vertical standards.

13. A moving apparatus for book shelf units of the type having longitudinally spaced vertical standards, the vertical standards being generally perpendicular to the ground and having a plurality of spaced slots for supporting horizontal shelves between the standards, comprising:

(a) at least one pair of independent lifting units disposed on opposite sides of a book shelf unit, each lifting unit including:

(i) a first and a second member each having a top and a bottom and being oriented generally perpendicular to the ground, the tops each defining an opening;

(ii) an elongated horizontal support member joining said first and second members near said bottoms;

(iii) a first and a second caster cooperatively connected to said bottom of each first and second member respectively, thereby allowing movement of each unit;

(iv) a cross bar support oriented generally parallel to the elongated horizontal support and having a first and a second guide sized and configured to slide within the openings of the first and second members; and (v) a lifting means mounted on said lifting unit and cooperatively connected to lift and lower said cross bar support;

(b) at least one end cross bar placed and mounted for support by and generally perpendicular to the cross bar supports of two opposed said lifting units in a manner such that said end cross bars extend between the shelves of the book shelf unit;

(c) at least one pair of intermediate cross bars oriented generally perpendicular to the cross bar support in a manner such that said intermediate cross bars extend between the shelves of the book shelf unit, the ends of said intermediate cross bars supportively resting upon said cross bar supports of said opposed lifting units;

(d) lifting members operatively connected to said end cross bars and to said intermediate cross bars, sized and configured to engage opposite sides of the vertical standards of the book shelf unit;

(e) whereby when said lifting means are effected to lift said cross bar support, said cross bar support moves in the plane of the first and second members as directed by said first and second guides, thereby engaging the end and intermediate cross bars, and moving their associated lifting members to directly lift the vertical standards of the book shelf unit, enabling the raised book shelf unit to be moved along the ground by said casters to a designated location where the lifting means can be effected for downward movement thereby returning the book shelf unit to the ground.

14. A moving apparatus according to claim 13, wherein said lifting means includes adjustment means for adjusting the vertical height at which said lifting means engage the vertical standards.

15. A moving apparatus according to claim 13, wherein said lifting members are arranged and configured to operatively engage the book shelf standards between shelves of the book shelf in a manner so as not to require movement of the shelves or contents of the shelves; whereby a loaded book shelf can be lifted and moved by the moving apparatus without disturbing the contents of the book shelf.

16. A moving apparatus according to claim 13, wherein said lifting members are arranged and configured for slideable insertion within the slots of the engaged vertical standards.

17. The moving apparatus according to claim 16, wherein each lifting member includes at least two prongs for each vertical standard engaged by said lifting members.

18. The apparatus according to claim 13 wherein each unit includes a lifting contact cooperatively connected to the cross bar support, the lifting contact axially aligned with said lifting means.

19. The apparatus according to claim 13 wherein each unit includes first and second brackets cooperatively connected to each first and second member near the bottom whereby a chain can be cooperatively connected to each bracket allowing connection of a pair of units.

20. The apparatus according to claim 13 wherein said lifting means includes a hydraulic jack.

21. The apparatus according to claim 13 wherein each cross bar support includes extension means whereby a pair of opposed units may be longitudinally connected to another pair of opposed units, thereby allowing for cooperative movement of additional book shelf sections.

22. The apparatus according to claim 21 wherein the extension means includes an extension member, the member generally H-shaped having a notch proximate each end of each prong of the H-shaped member.

23. The apparatus according to claim 22 wherein the cross bar support includes a pair of extension pins proximate each end thereof, the extension pin including a shaft cooperatively connected to a pair of shoulders proximate each end, whereby the notches of the extension member fit around the shaft thereby connecting the units.

24. A method of lifting and moving a book shelf unit of the type having a plurality of vertical support standards longitudinally spaced along the shelf unit, said support standards having a plurality of vertically spaced slots therealong for adjustable mounting and supporting shelves between the standards, the method, comprising:
 (a) retainably engaging at least a pair of said spaced vertical support standards at positions therealong spaced from the ground;
 (b) lifting said vertical standards and thereby said book shelf units from the ground at said positions of engagement; and
 (c) moving said lifted book shelf unit along the ground by rolling means operatively connected to the lifting and engaging means.

25. The method according to claim 24, wherein said engaging means includes pronged lifting members arranged and configured for slideable insertion within at least two slots of each of said vertical standards.

26. The method according to claim 24, wherein said lifting means includes a hydraulic jack.

27. The method according to claim 22, wherein said moving means includes casters.

* * * * *